(12) United States Patent
Moller

(10) Patent No.: US 6,808,140 B2
(45) Date of Patent: Oct. 26, 2004

(54) VERTICAL TAKE-OFF AND LANDING VEHICLES

(76) Inventor: Paul S. Moller, 1222 Research Park Dr., Davis, CA (US) 95616

( * ) Notice: Subject to any disclaimer, the term of this patent is extended or adjusted under 35 U.S.C. 154(b) by 1 day.

(21) Appl. No.: 10/360,533

(22) Filed: Feb. 7, 2003

(65) Prior Publication Data

US 2004/0026563 A1 Feb. 12, 2004

Related U.S. Application Data

(60) Provisional application No. 60/355,270, filed on Feb. 8, 2002.

(51) Int. Cl.$^7$ ............................................. B64C 29/00
(52) U.S. Cl. ..................... 244/12.5; 244/23 D
(58) Field of Search ............................. 244/12.5, 23 D, 244/12.1, 23 R, 12.4, 15

(56) References Cited

U.S. PATENT DOCUMENTS 3,291,242 A * 12/1966 Tinajero ..................... 180/116
4,071,207 A * 1/1978 Piasecki et al. ........... 244/23 D
5,115,996 A * 5/1992 Moller ....................... 244/12.5
6,450,445 B1 * 9/2002 Moller ....................... 244/23 A

* cited by examiner

Primary Examiner—Peter M. Poon
Assistant Examiner—Timothy D. Collins
(74) Attorney, Agent, or Firm—Burns, Doane, Swecker & Mathis LLP; Claude A. S. Hamrick

(57) ABSTRACT

A VTOL vehicle including a fuselage with two foldable wings, two tiltable nacelles attached to the wings, a vertical stabilizer, a horizontal stabilizer, and two auxiliary thrusters. Each nacelle contains a system of vanes located at the rear opening thereof, and actuators are provided for extending and retracting the vanes in conjunction with nacelle tilting mechanisms to deflect the airflow over a predetermined range of angles from the horizontal. Each nacelle also contains two rotary engines, each of which directly drives a fan. The fans face each other and operate in counter-rotating directions at the same rotational speed. An alternative embodiment includes two additional nacelles attached to the fuselage instead of having the auxiliary thrusters. A redundant computerized flight control system maintains stability of the vehicle as it transitions from one flight mode to another.

15 Claims, 17 Drawing Sheets

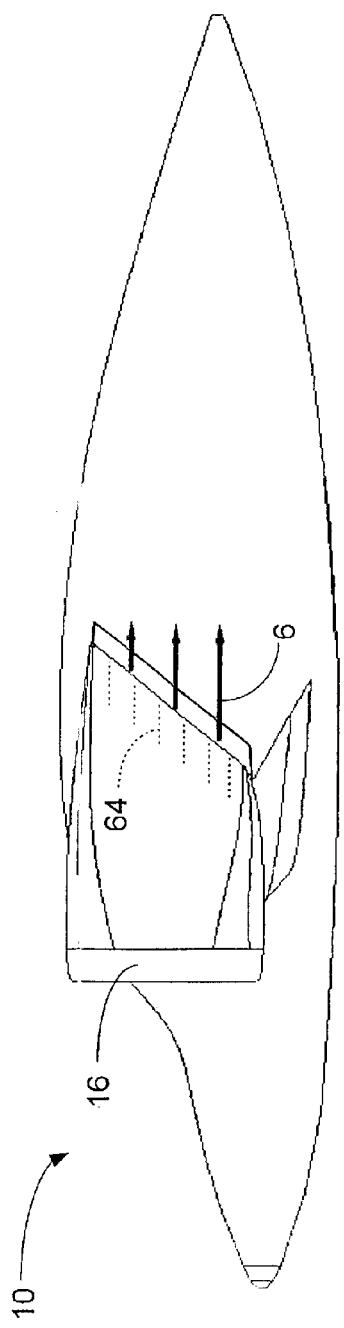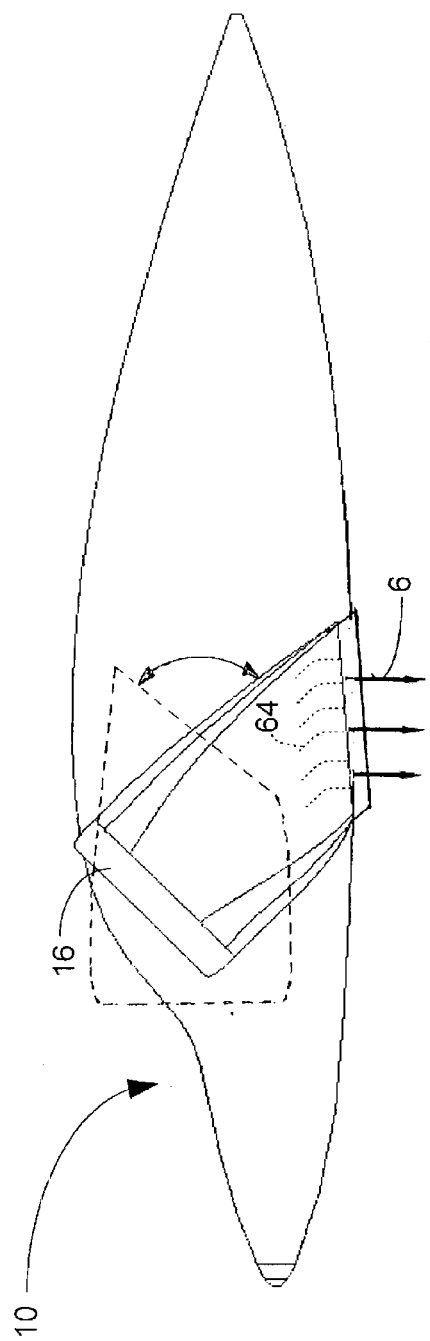
FIG. 8
FIG. 9

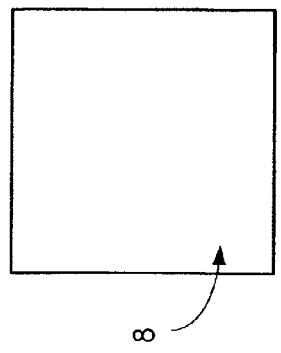
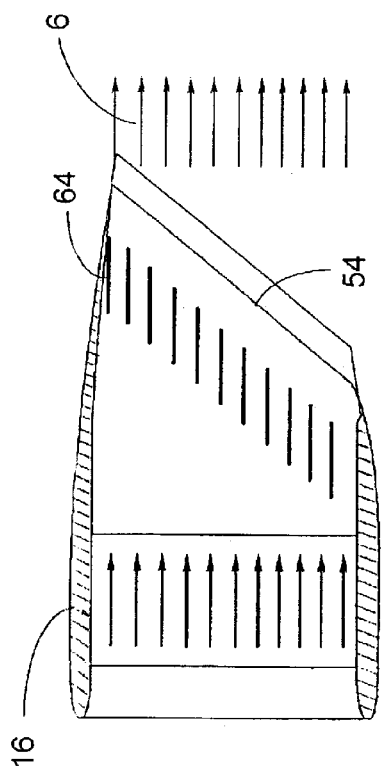
FIG. 10B
FIG. 10A
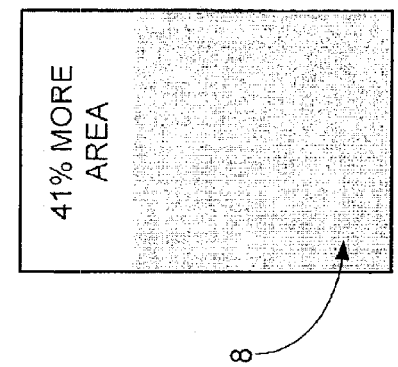
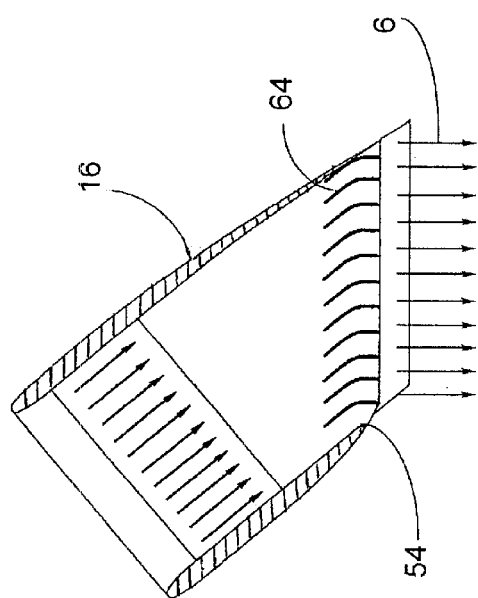
FIG. 11B
FIG. 11A

Hover Flight

Early Transition Flight

Transition Flight

Late Transition Flight

Aerodynamic Flight

Tt = Total Thrust 80
Th = Horizontal Thrust 82
Tv = Vertical Thrust 84
Tf = Front auxiliary Thrust 86
Tr = Rear auxiliary Thrust 88
Lw = Wing Lift 90
Lt = Tail Lift 92

VERTICAL TAKE-OFF AND LANDING VEHICLES

CROSS REFERENCE TO RELATED APPLICATIONS

This application claims the benefit of U.S. Provisional Application No. 60/355,270, filed on Feb. 08, 2002.

BACKGROUND OF THE INVENTION

1. Field of the Invention

The present invention relates generally to VTOL vehicles, and more particularly to an improved VTOL vehicle having ducted fan propulsion systems wherein nacelles forming ducts housing the engines can be tilted, and the thrust can be selectively vectored by tilting the nacelles and actuating adjustable vanes mounted in the aft portion of each nacelle duct.

2. Brief Description of the Prior Art

Several attempts have been made to create a vehicle that can be flown in the air as well as driven on land. It is desirable that such craft be capable of vertical takeoff/landing (VTOL) in order to minimize the runway space necessary for lift-off. One approach to achieve required lift for take-off/landing and thrust for conventional level flight includes the tilting of engine driven fans or propellers to vector the thrust from the vertical to the horizontal direction. Another approach mounts fans in a fixed position and various means providing for deflecting the flow generated by the fan to achieve the desired thrust vectoring.

The first approach can be found in U.S. Pat. No. 5,839,691 to Lariviere. Therein, the disclosed VTOL aircraft has propellers the rotational axis of which is rotated through 90 degrees from the vertical to the horizontal direction as the aircraft transitions from lift-off to its cruising configuration. Such a tilt-rotor configuration induces the mass flow of air displaced by the propeller around the aircraft's lifting surfaces, known as propeller wash. The propeller wash is significant at the early stage of transition from vertical to horizontal flight and the final stage of transition from horizontal to vertical flight, as the rotational axis of the propeller makes a large angle with respect of the horizontal direction. The propeller wash affects the aerodynamic forces and moments of the aircraft causing profound difficulties in aircraft control. In addition, at the transitional stages, the wing can generate negative lift due to the propeller wash and the engine must produce extra thrust to compensate for the negative lift. Also, a large aerodynamic drag is generated on the wings during hovering and reduces payload. To handle the effects of propeller wash, extra structure for supporting the propellers and additional control surfaces are required.

This approach is user unfriendly with large rotating open blades. In addition, in a case like the V22 Osprey, the aircraft cannot land conventionally with the rotors transitioned to the forward flight position because the rotors are so large that they would contact the ground. Another disadvantage of this approach is that the rotors of the aircraft must be geared together by a gearbox to prevent catastrophic failure should an engine fail, and gearbox failure is the major mechanical failure mode in the aircraft.

The alternative to the first approach is to use ducted fans, which rotate through 90 degrees. This approach is more user friendly and the aircraft can land conventionally on a standard runway should the engine fail. However, ducts that rotate through the full 90 degrees can create leading edge stall at some point in the transition where the duct is still at a high angle and the aircraft is flying quite fast. If this airflow stall occurs, a successful transition is unlikely. Many VTOL aircraft employing this approach have crashed. Applicant's present invention overcomes this ducted fan problem by only partially rotating the ducts and then using deflection vanes to complete the redirection of the thrust. Thus, the ducted fans rotate to the horizontal position (fan centerline in direction of flight) very early in transition when the horizontal velocity is still low. This eliminates duct leading edge separation. Thrust for transitioning from hover to forward flight in accordance with the present invention occurs by creating a small reduction in the angle of orientation of the duct centerline relative to the angle of orientation of the fuselage centerline, which generates a substantial horizontal thrust.

The second approach is found in U.S. Pat. No. 4,358,074 to Schoen, wherein a propulsion system for VTOL aircraft has stationary ducts which vector the airflow by utilizing a movable, fixed camber, cascading vane system in addition to a slotted flap system. The airflow within each nacelle is divided into two streams. One of the streams is directed downwardly through the fixed camber vane system. The other stream is exhausted through an aft nozzle at the outlet, against a slotted flap system mounted on a wing located immediately behind the duct. The fixed camber vane system can only direct a limited amount of airflow through very modest angles before the flow separates creating thrust loss. The slotted flap system is required to deflect the full stream through large angles by utilizing the wing flap system alone.

Another flow deflection system that includes adjustable vanes is disclosed in U.S. Pat. No. 5,115,996 to the present inventor Paul Moller. In the Moller '996 patent, a VTOL aircraft is disclosed having ducted fan propulsion systems wherein ducted nacelles housing the engines remain stationary with their axial center lines approximately parallel with the center line of the fuselage, and the thrust is selectively vectored by adjustable vanes mounted in the aft portion of each nacelle duct.

The inventor has found a disadvantage in this design, however. In this design, the adjustable vanes were required to bend the flow through 90 degrees. The problem with doing this is that the cross-sectional area of the flow as it moves through the vanes changes dramatically, as shown in FIG. 1A of this application. The air is assumed to flow in the passage from left to right, with the passage having varying cross-sectional dimensions. It can be seen that the cross-sectional diameter at point A where the air stream enters the passage is smaller than at point B, as it turns the corner, and then narrows again at point C where it exits the passage. As the flow approaches the turning section, the flow slows down until it passes the point B. At the same time, the pressure increases to generate an adverse pressure gradient inducing the rapid growth of a boundary layer. The boundary layer is the thin layer of flow near the surface and, in the current configuration, develops on the convex side of the vanes and the inner walls holding the lateral ends of the vanes. Upon further turning of the flow stream, the boundary layer thickness can grow to a considerable size, which can lead to flow separation and, as a consequence, reduce the effective cross-sectional area of the airflow and lower the efficiency of the vanes. One solution to this flow separation is to thicken the cross section of the vanes as shown in FIG. 1B to maintain constant cross sectional area of the flow at points A, B, and C as shown. This will help keep the flow velocity constant but will create an interference with the flow when the vanes are retracted as shown in FIG. 1C, as the distance at points A, B and C now will vary. In this case, the flow speeds up and slows down for no useful purpose with an associated pressure thrust loss. Another drawback of this solution is the development of a boundary layer near the trailing edge of the vanes, which will reduce the efficiency of the vane system.

As mentioned above, various aerodynamic and control problems of the first approach occur at the transitional stages. Also, the existing tilt-rotors have inherent complexities in the design of propellers themselves and structural mechanism for propeller cyclic pitch control. In the second approach, the efficiency of the vane systems declines as the flow turning angle increases. Thus, there is a need for an improved VTOL vehicle design having tiltable fans that cooperate with the adjustable vane systems to produce effective power modulation and thrust vectoring, operate in the ranges where the problems associated with an individual approach are not present, and do not contain the inherent complex structures related to propellers.

OBJECTIVES OF THE PRESENT INVENTION

It is therefore a primary objective of the present invention to provide an improved VTOL vehicle that utilizes nacelles in conjunction with adjustable vane systems to eliminate duct leading edge stall during the transition of the flight mode, to enhance thrust efficiency, to eliminate the need for variable pitch fans and to reduce the tendency to suck foreign objects into the fans.

Another object of the present invention is to provide an improved VTOL vehicle that has mechanisms for tilting the nacelles and sensors for monitoring the tilting angle.

Yet another object of the present invention is to provide an improved VTOL vehicle that includes an adjustable vane system with enhanced thrust efficiency and reduced fluid mechanical losses.

Still another object of the present invention is to provide an improved nacelle configuration and orientation system that, in addition to generating prime mover thrust, can also be used to control vehicle pitch and roll.

A further object of the present invention is to provide an improved VTOL vehicle that may include either two or four nacelle mounted power plants.

An additional object of the present invention is to provide an improved VTOL vehicle having engine control systems with improved response characteristics for vehicle attitude control.

The foregoing and other objects, features, and advantages of the invention will be apparent from the following detailed description of the preferred embodiments which make reference to several figures of the drawing.

SUMMARY OF THE PREFERRED EMBODIMENT

Briefly, a preferred embodiment of the present invention includes a fuselage with two foldable wings, two tiltable nacelles attached to the wings, a vertical stabilizer, a horizontal stabilizer, and two auxiliary thrusters. Each nacelle contains a system of vanes located at the rear opening thereof, and means are provided for extending and retracting the vanes in conjunction with nacelle tilting mechanisms to deflect the airflow over a predetermined range of angles from the horizontal. Each nacelle also contains two rotary engines, each of which directly drives a fan. The fans face each other and operate in counter-rotating directions at the same rotational speed. An alternative embodiment includes two additional tiltable nacelles attached to the fuselage instead of having the auxiliary thrusters. A redundant computerized flight control system maintains stability of the vehicle as it transitions from one flight mode to another.

IN THE DRAWING

FIGS. 1A–C illustrate side elevational views of pairs of air-stream deflection vanes of prior art configuration;

FIG. 8 is a partial side elevation of the VTOL vehicle of FIG. 2 with the deflection vanes retracted and the nacelle disposed in its horizontal configuration, as when engaged in level flight;

FIG. 9 is a partial side elevation of the VTOL vehicle of FIG. 2, with the deflection vanes extended and the nacelle rotated 45 degrees as when in its hovering, take-off, or landing configuration;

FIG. 10A shows a schematic side section of a nacelle with its deflection vanes retracted and the nacelle disposed in its horizontal configuration, as when in level flight, and FIG. 10B depicts the corresponding duct exit area;

FIG. 11A shows a schematic side section of a nacelle with its deflection vanes extended and the nacelle rotated 45 degrees, as when in hovering, take-off, or landing configuration, and FIG. 11B depicts the corresponding effective exit area;

Figure 2:
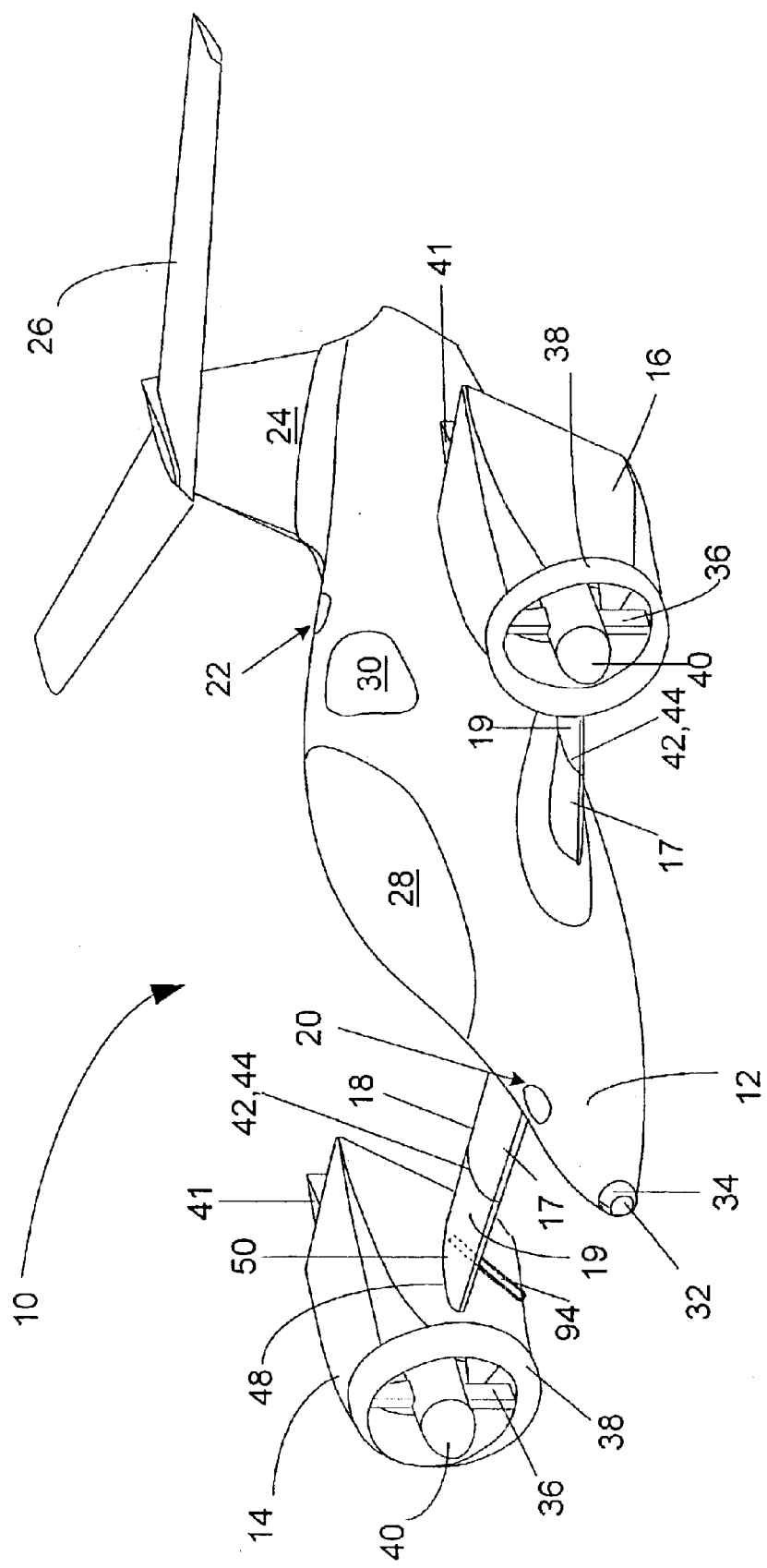
FIG. 2 shows a perspective view of a VTOL vehicle in accordance with the present invention including two nacelles.
Figure 13A:
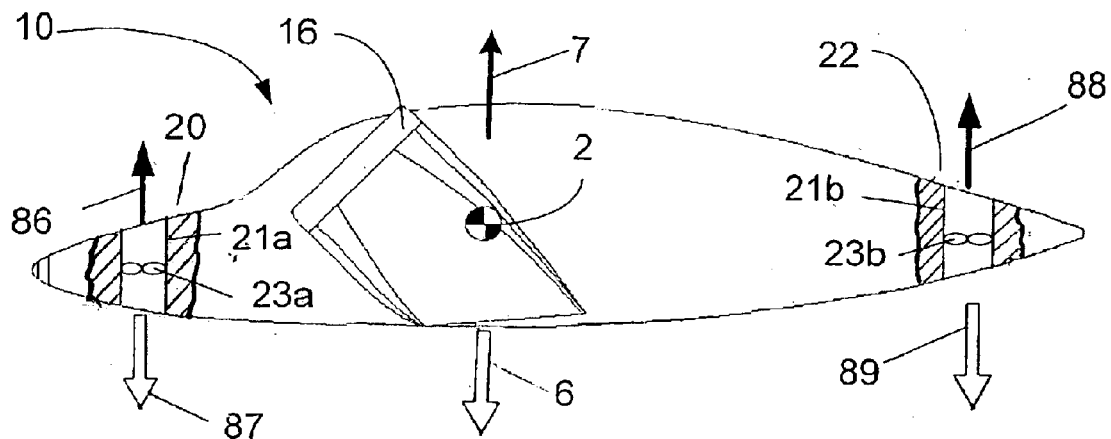
Figure 13B:
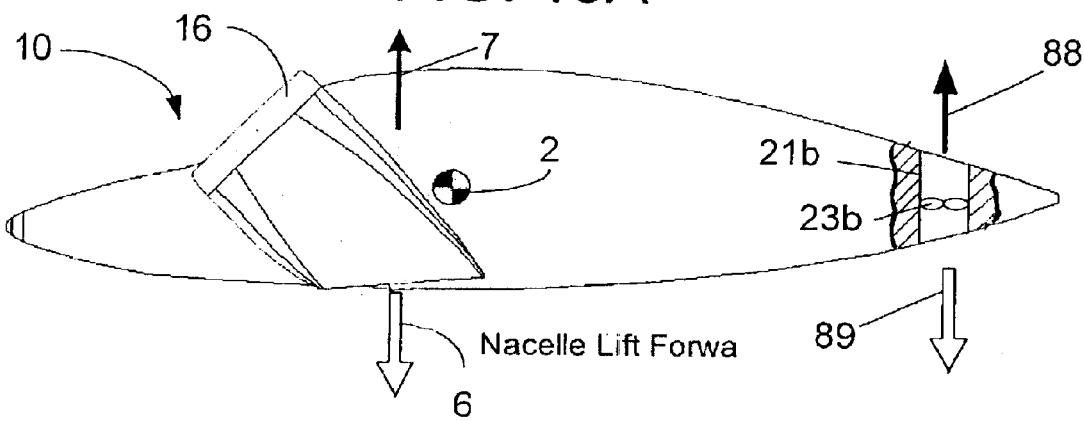
Figure 13C:
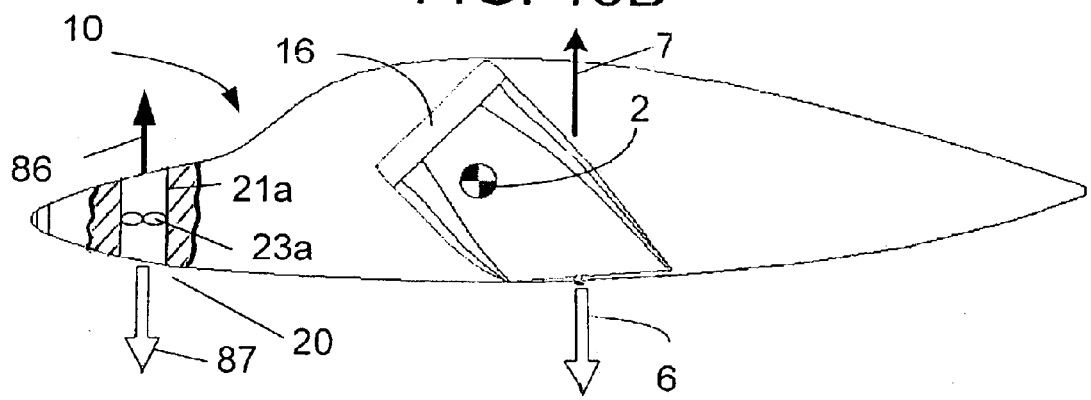
Figure 14:
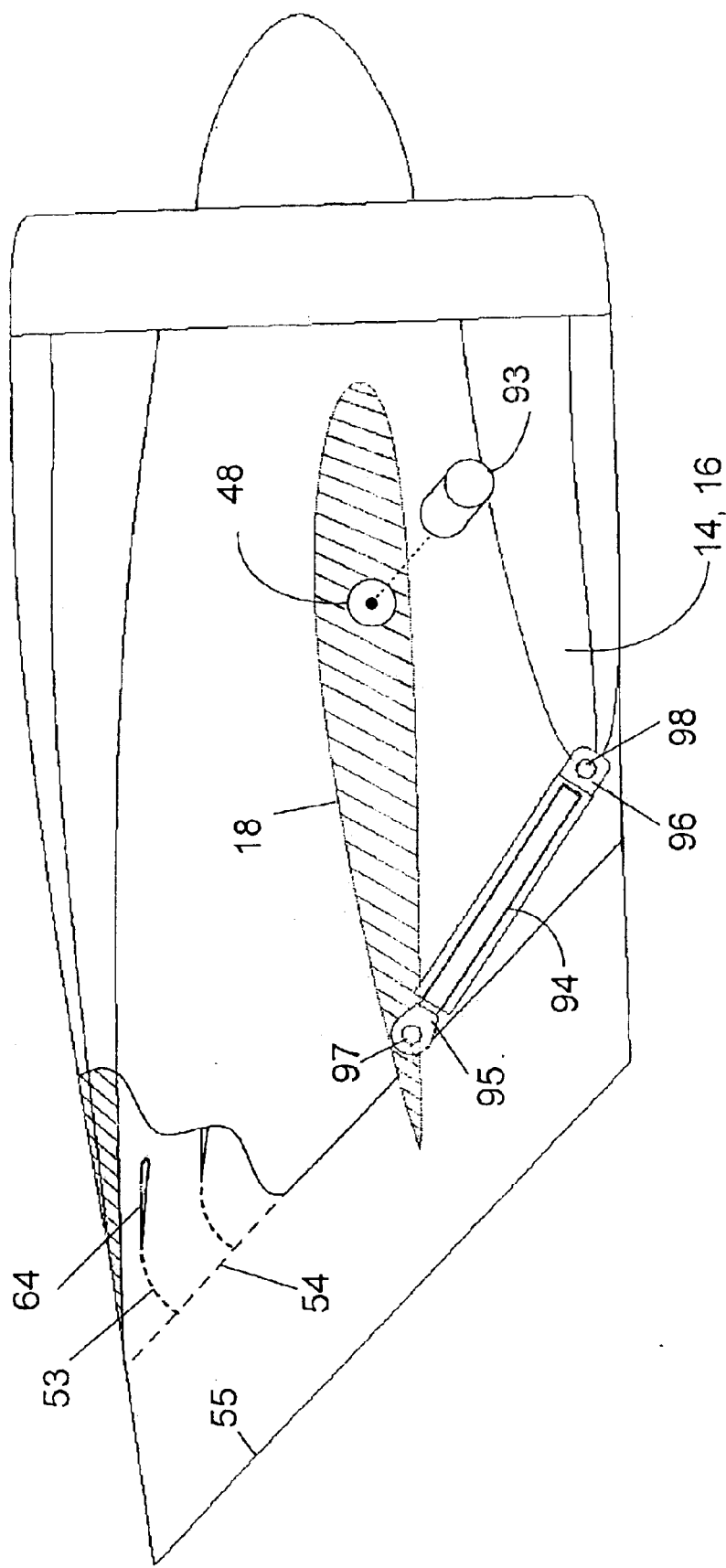
Figure 15:
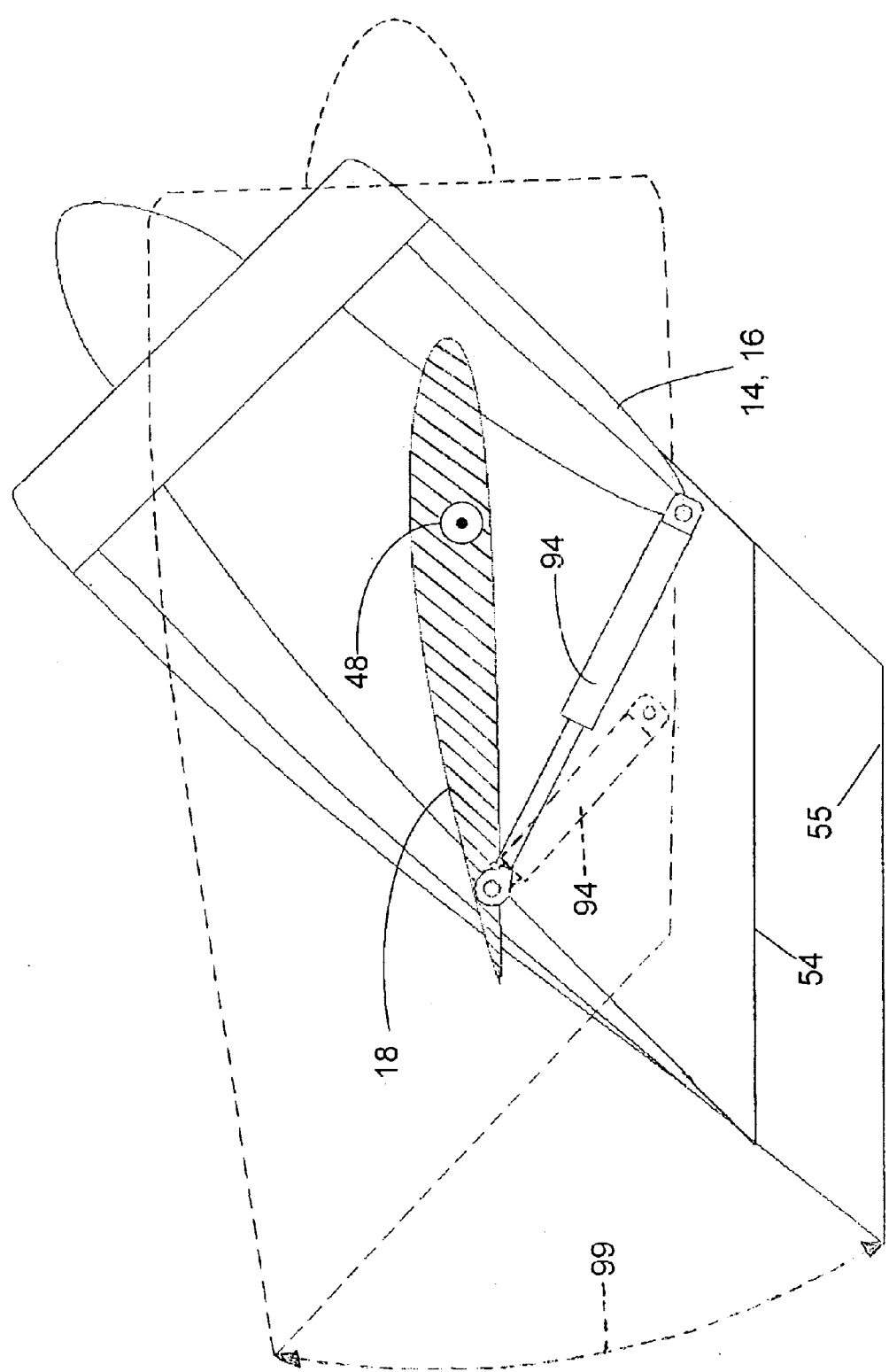
Figure 16:
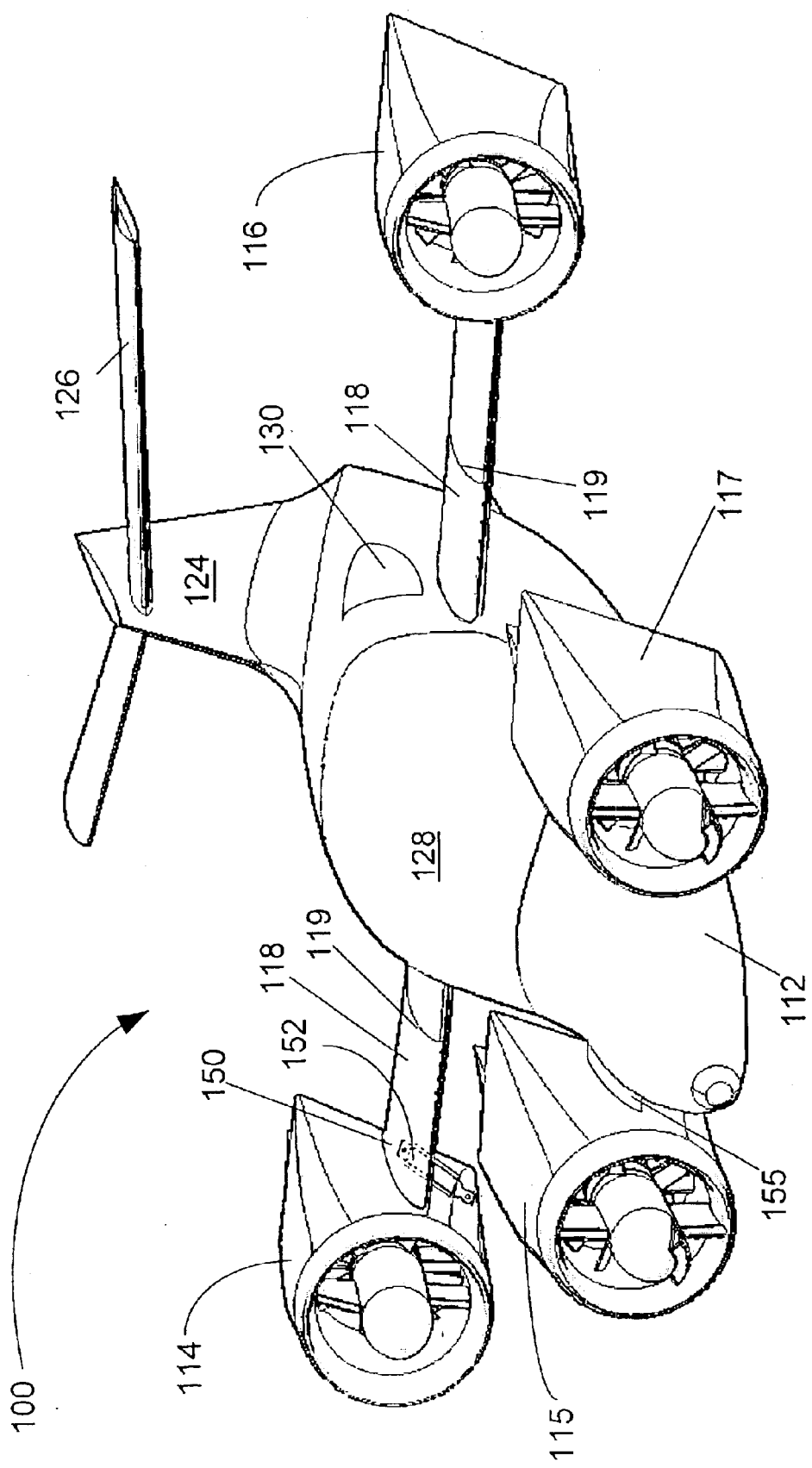
Figure 17:
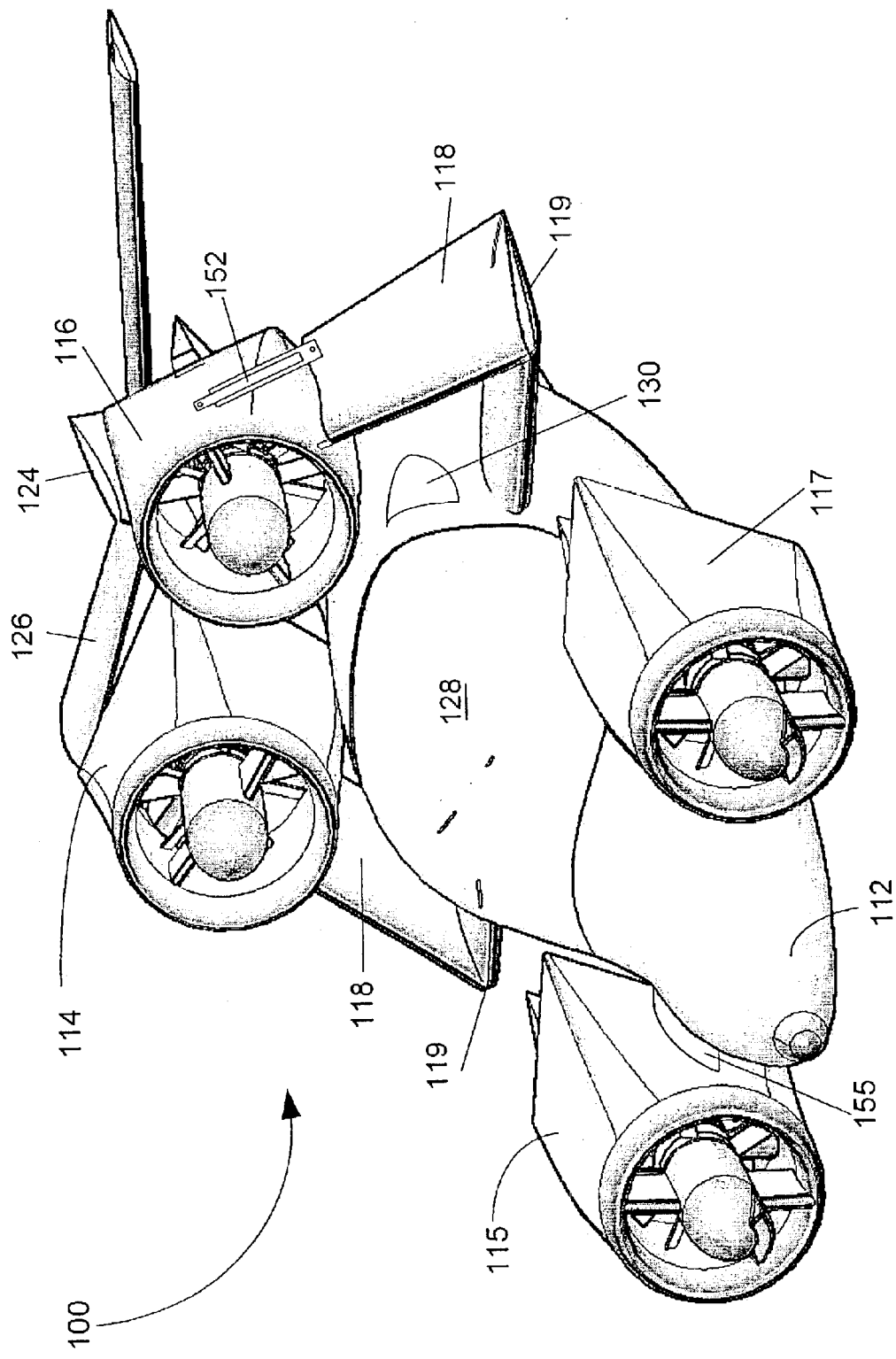
Figure 18:
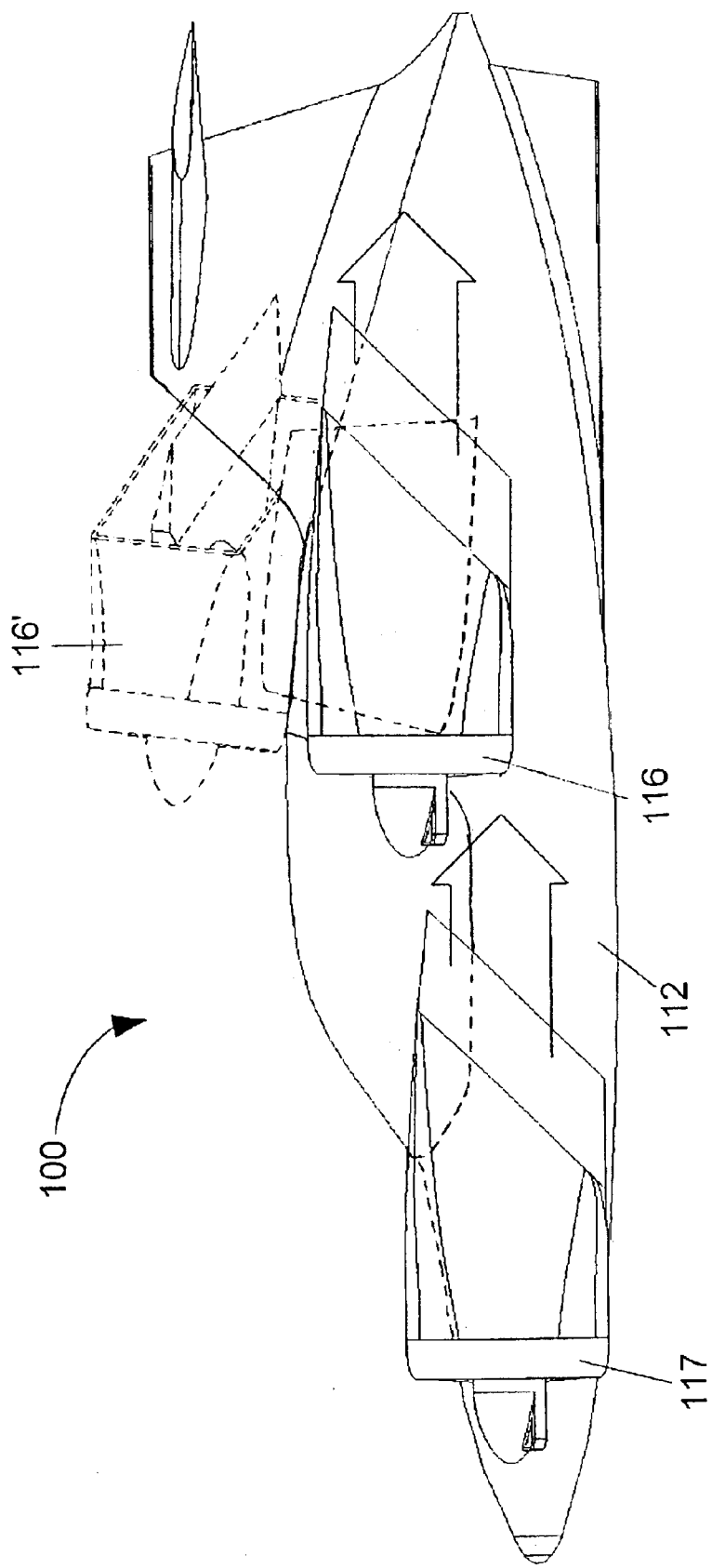
Figure 19:
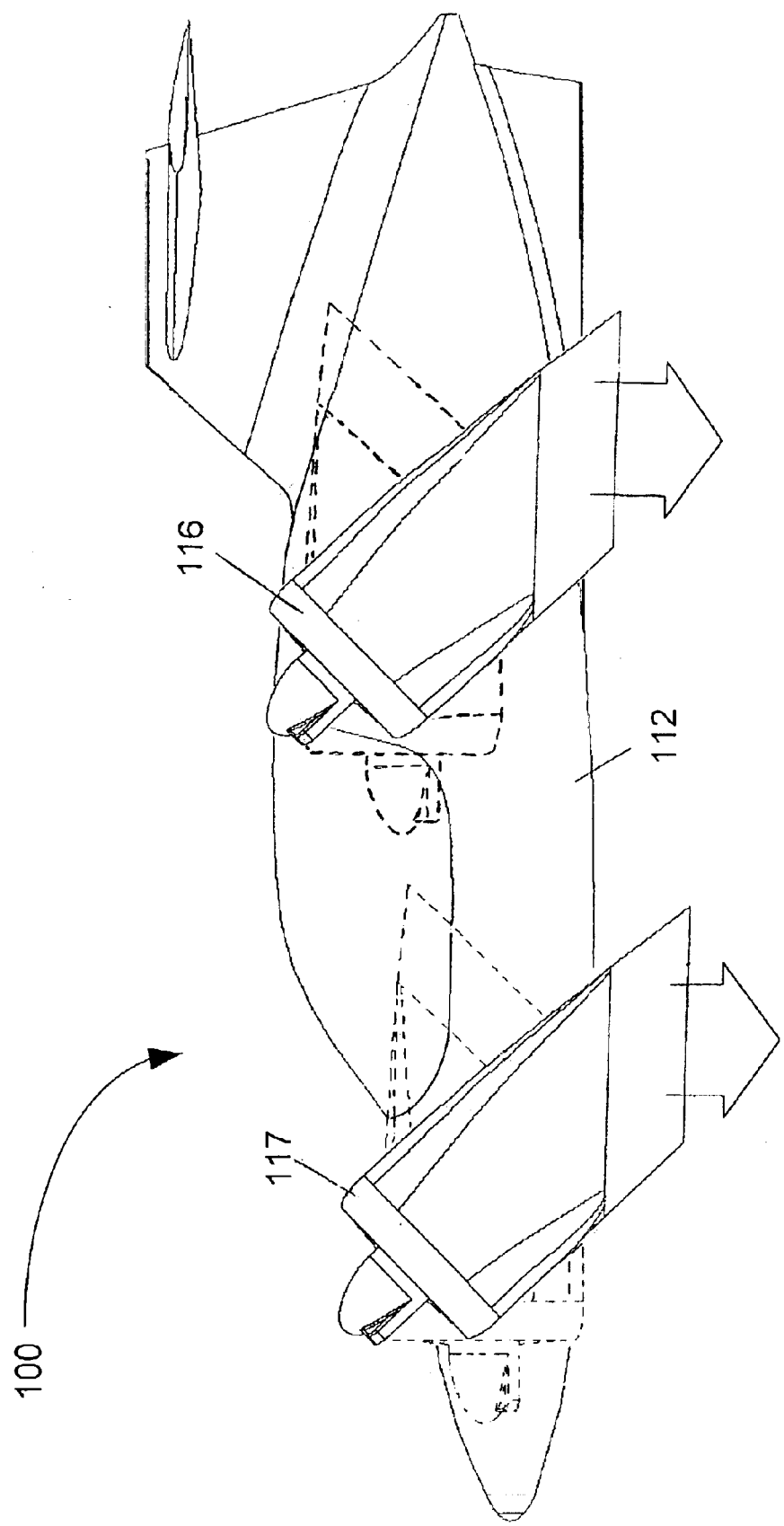
Figure 20:
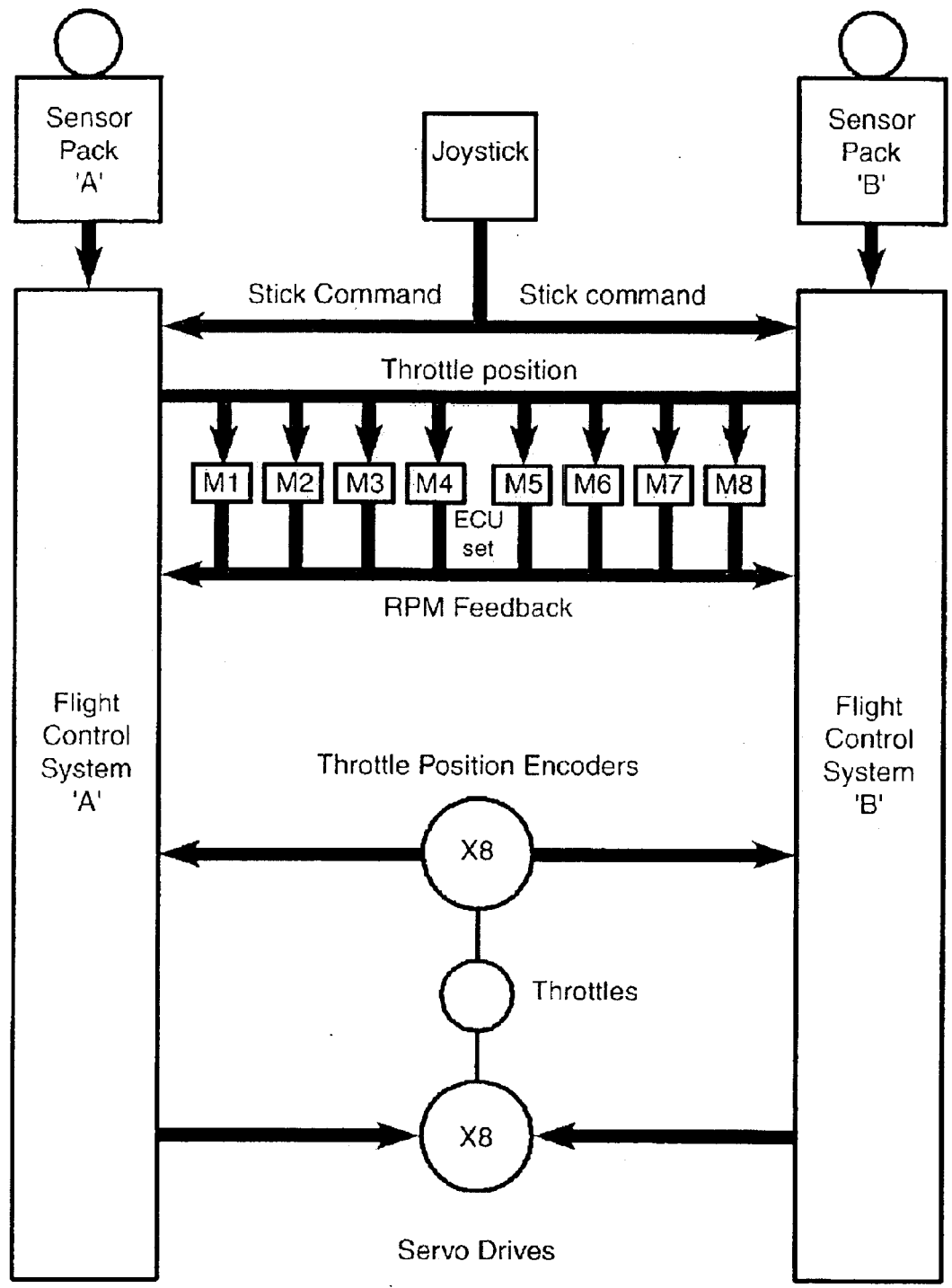

FIGS. 12A–E are schematic side views of the VTOL vehicle of FIG. 2, with the nacelle shown progressively rotated and vanes deployed as the vehicle transitions through various stages between hover flight and level flight;

FIGS. 13A–C are side views of various embodiments of the VTOL vehicle of the present invention, with the nacelle placed in various locations relative to the center of gravity, and the use of one or two auxiliary thrusters to provide control and stability;

FIG. 14 is a partially broken side view of the inboard side of a nacelle showing its linear actuator retracted, so that the nacelle is disposed in horizontal configuration as when in level flight;

FIG. 15 is a side view as in FIG. 14 but with the linear actuator extended, so that the nacelle is rotated 45 degrees as when in hovering, take-off or landing mode;

FIG. 16 is a perspective view of an alternate embodiment of the VTOL vehicle of the present invention, which includes four tiltable nacelles;

FIG. 17 is a perspective view of the VTOL vehicle of FIG. 16 with its rear wings folded, as when configured for land travel or parking;

FIG. 18 is a side elevational view of the embodiment of FIG. 16 showing the nacelles in level flight configuration;

FIG. 19 is a side elevational view of the embodiment of FIG. 16 showing the nacelles in hover, take-off, or landing configuration; and FIG. 20 is a simplified block diagram showing the principal components of the redundant control system that electronically synchronizes the engines.

DETAILED DESCRIPTION OF THE PREFERRED EMBODIMENTS

Referring now to FIG. 2 of the drawing, a preferred embodiment of the present invention in the form of a Vertical Take-off and Landing (VTOL) vehicle has two nacelle power plants and fore and aft auxiliary thrusters. As illustrated in the various drawings herein, the present invention can be implemented in any of several different configurations.

Figure 3:
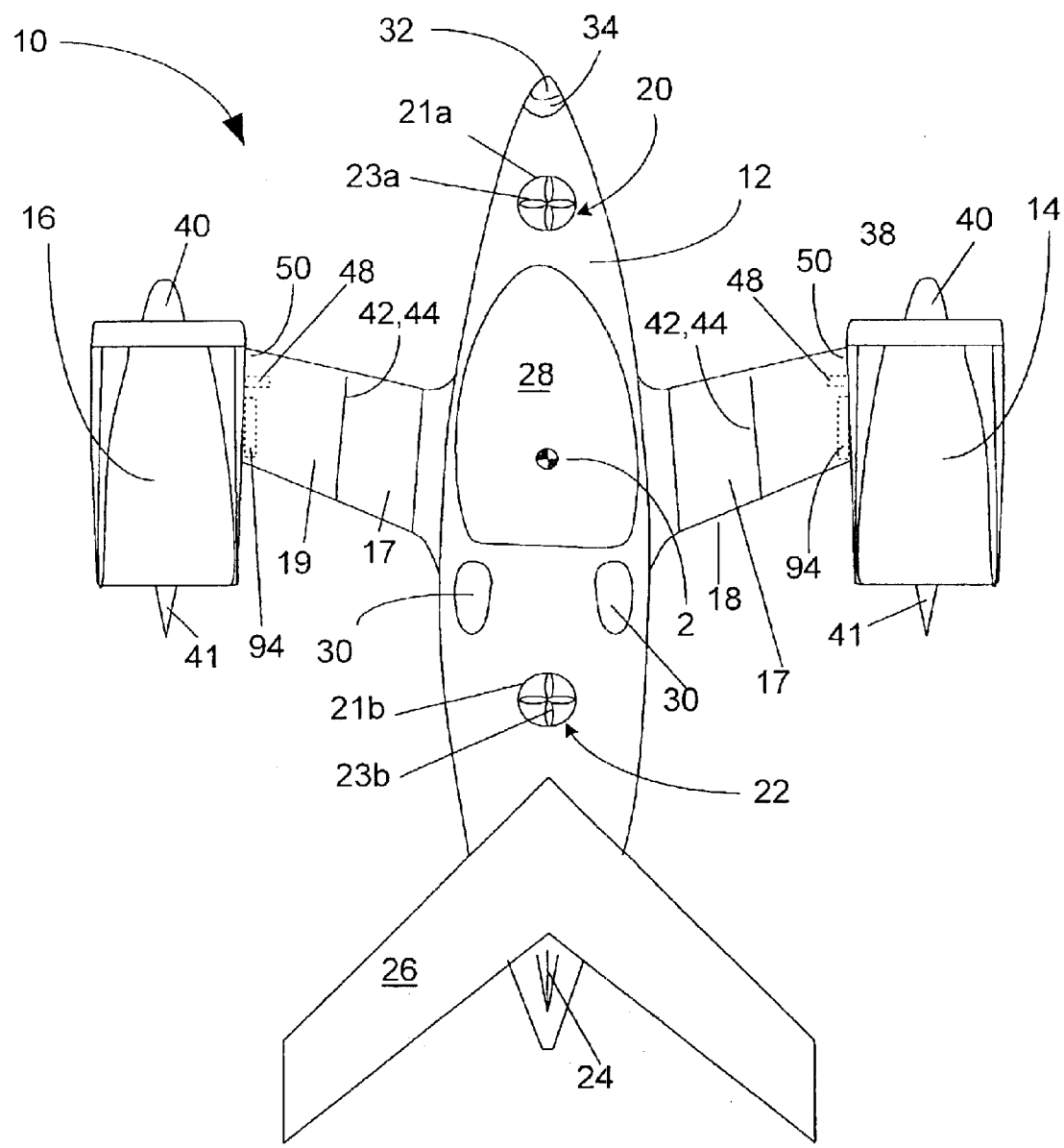
FIG. 3 shows a top plan view of the VTOL vehicle shown in FIG. 2.

As shown in FIGS. 2 and 3, the preferred embodiment includes an elongated fuselage 12 including a right nacelle 14 and a left nacelle 16, which are attached to the fuselage 12 by two short wings 18, including inboard segments 17 and outboard segments 19.

In this embodiment, the two nacelles 14 and 16 are located on each side of the fuselage 12 at or near the center of gravity 2 of the fuselage 12. Each nacelle is rotated about an axis passing through the wings (as will be further described below) by linear actuator 94. The center of gravity 2 (FIG. 3) is shown in approximate position, although it is to be understood that the precise location of this center will change slightly with loading conditions and that the position of the two nacelles 14 and 16 will also change slightly when they are rotated, as described below.

This embodiment also includes two auxiliary lift thrusters 20 and 22 mounted in the fuselage in open-ended ducts 21a and 21b forming the outer boundaries of the thrusters. The thrusters also include fans 23a and 23b and motors driven by a power supply. For convenience, the motors and the power supply are not shown in FIG. 3. Even though the required thrust is provided by power plants in the nacelles 14 and 16, the auxiliary thrusters 20 and 22, which are used to provide pitch control, also provide lift during take-off, hovering, landing, and transitional flight modes. By positioning the auxiliary thrusters 20 and 22 at a distance from the center of gravity 2, mechanical advantage is gained; a very small amount of thrust is needed to control pitch variations. Since the amount of thrust required from these auxiliary thrusters 20 and 22 is small, the auxiliary thrusters can be as simple as electrically driven fans. Electric fans are historically much more reliable and of lower cost than engine driven thrusters.

A vertical stabilizer 24 is attached to and rises from the rear of the fuselage 12, and supports a horizontal stabilizer 26 attached thereto. A detailed explanation of details of a horizontal stabilizer like that shown at 26 can be found in the Moller '996 patent. The fuselage 12 is aerodynamically shaped to minimize the aerodynamic drag. A sturdy transparent canopy 28 covers the front portion of the cockpit and opens for pilot and passenger boarding. Just behind the canopy 28 are two passenger windows 30, one on each side of the fuselage 12. At the tip of the fuselage 12 is a headlight 32 surrounded by a transparent plastic headlight cover 34 for protection.

As suggested by the dashed line 48, rotational mechanisms extend from and attach the nacelles 14 and 16 to the wingtips 50 of the wings 18, and allow them to be rotated through an arc of approximately 45 degrees, plus or minus about 5 degrees. This approximately 45 degree rotation acts together with vane systems (described below) inside the nacelles 14 and 16 that turn the airstream another approximately 45 degrees, so that the streams of airflow can be directed to exit these nacelles vertically during take-off, hovering and landing, as will also be described later. A detailed description of a similar vane system for selectively redirecting a flow stream from 0 to 90 degrees can be found in the Moller '996 patent. The actuator mechanisms 94 used to rotate the nacelles are shown in FIGS. 14 and 15 as described below.

Several parts of the nacelles 14 and 16 are illustrated in FIGS. 2–3; for example, the engine mounting struts 36, the exhaust shrouds 38, the engine accessory nose cones 40, and the dividing struts 41. Other components of the nacelles 14 and 16 will be shown and explained later.

Figure 4:
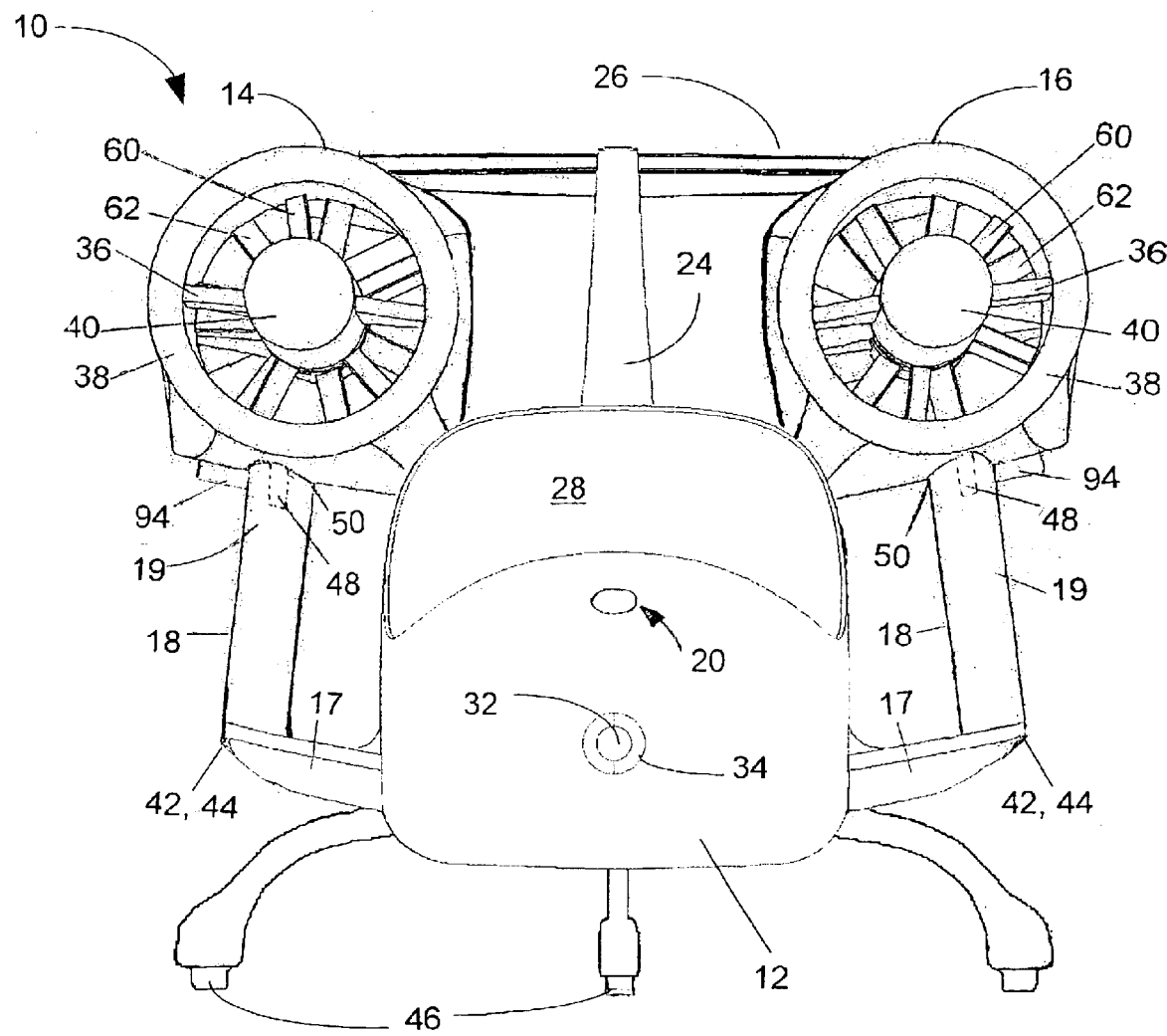
FIG. 4 is a front elevational view of the VTOL vehicle of FIG. 2 with its wings folded as when used for land travel.

In this embodiment, the wings 18 are articulated to allow reduction in the width of the vehicle on the ground. Hinges 42 are included at folding joints 44 of the wings 18 which allow the wingtips 50 and nacelles 14 and 16 to be folded upward when the vehicle 10 is to be driven as an automobile, as shown in FIG. 4. The outboard segments 19 of the wings can be folded upwardly at the joints 44 until they are approximately vertical, with the nacelles 14 and 16 raised slightly above and to the side of the canopy 28, still leaving room for the canopy 28 to open and passengers to enter and depart the vehicle 10. The width of the vehicle 10, when the wings 18 are folded upwards, is less than the legal road width limit of 8.5 feet, making it possible to drive on city streets and roads. There are retractable wheels 46 that are deployed when the vehicle 10 makes a landing. Each nacelle has two counter-rotating rotary engines and fans, of which blades 60 and 62 are shown in FIG. 4. Engine and fan details of power plants suitable for use in this embodiment are given in my prior patent (Moller '996 patent).

The wing sections 18 extending between the fuselage 12 and the nacelles 14 and 16 generate lift very efficiently because the nacelles 14 and 16 act as winglets that prevent the higher pressure air below the wings 18 from traveling around the wingtips 50, and, thus, make the wings 18 behave like longer wings without winglets. The geometric aspect ratio is normally defined as $span^2$/wing-area. However, in this embodiment, the winglets make this aspect ratio appear much larger. Thus a term called "effective aspect ratio" is used in place of geometric aspect ratio to describe the operating aspect ratio. The effective aspect ratio directly affects the aerodynamic induced drag, and, as a consequence, the passenger miles per pound of fuel burned is proportional to the square root of the effective aspect ratio. In this embodiment of the present invention, due to the nacelles 14 and 16 acting as winglets, the effective aspect ratio of the wings 18 is approximately 6 and is estimated to be approximately twice as larger as the geometric aspect ratio.

Figure 5:
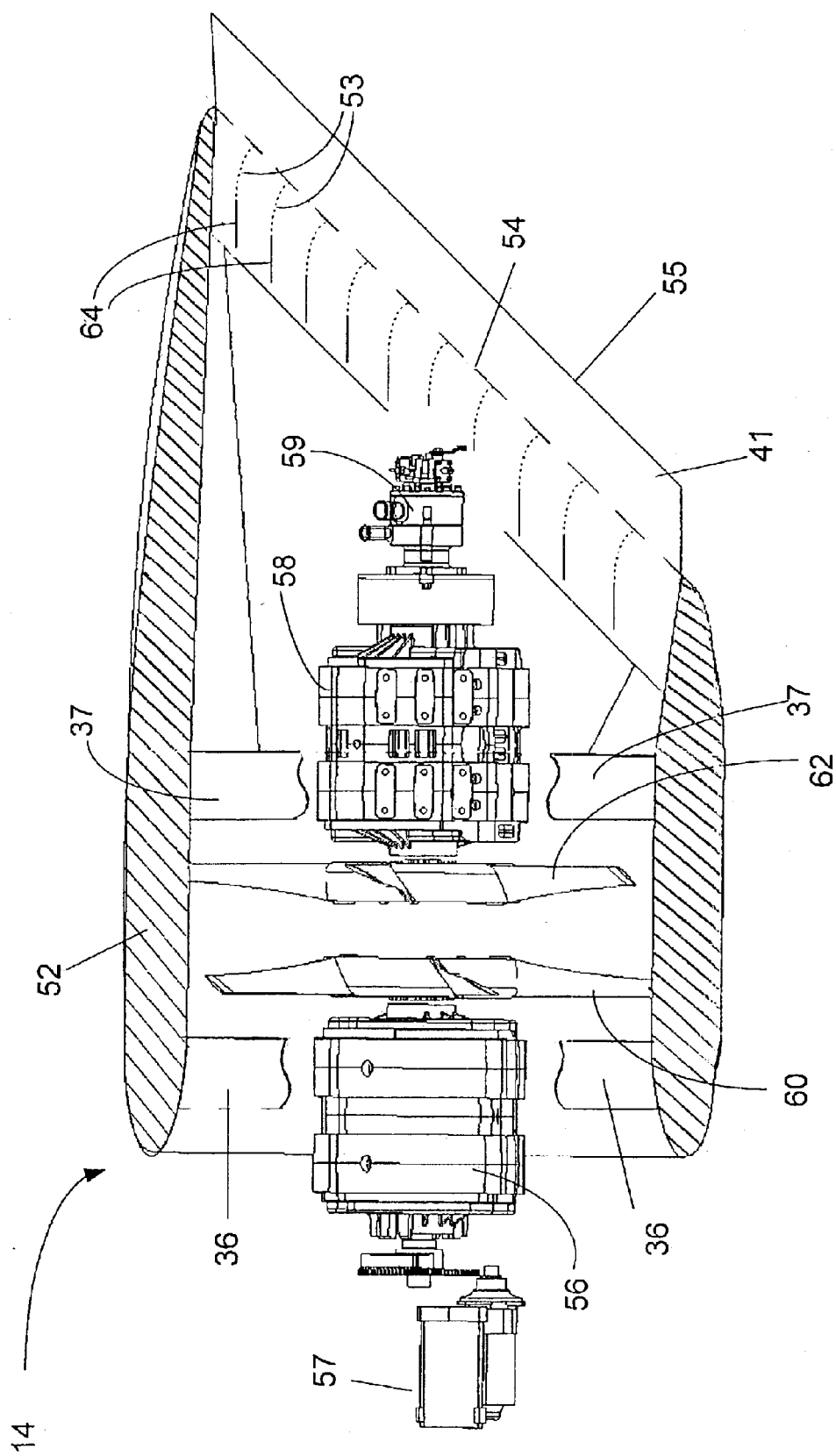
FIG. 5 is a side cut-away view showing some of the internal detail of a nacelle of the type depicted in FIG. 2.

FIG. 5 shows an interior view of the nacelle 14 from which the side wall of the nacelle housing 52, the engine accessory nose cone 40, and the exhaust shrouds 38 have been removed. Preferably, the nacelle housing 52 has an annular airfoil shape transitioning at the rear opening 54 to a more rectangular configuration. The rear opening 54 of the nacelle is angled to lie within a plane whose top is rotated rearward relative to a normal to the longitudinal axis of the nacelle 14. Each nacelle includes two rotary engines 56 and 58, and these engines drive fan blades 60 and 62 in counter-rotation. Each rotary engine is capable of producing approximately two horsepower per pound of engine weight, while each nacelle is capable of producing approximately three pounds of thrust per horsepower. Engines 56 and 58 are mounted to the engine mounting struts 36 and 37 which span the distance between the inside wall of the nacelle housing 52 and the engines. The exhaust gas from the engines 56 and 58 is directed through ducts (not shown) and caused to exit through exhaust ports extending along the rear edge 55 of a vertically extending flow dividers 41. In FIG. 5, a carburetor 57 and starter 59 are also shown. A detailed description of the other parts contained in the nacelle 14 can be found in the Moller '996 patent. Also shown generally in this figure are guide slots 53 and articulated vanes 64 that will be explained below.

Figure 6:
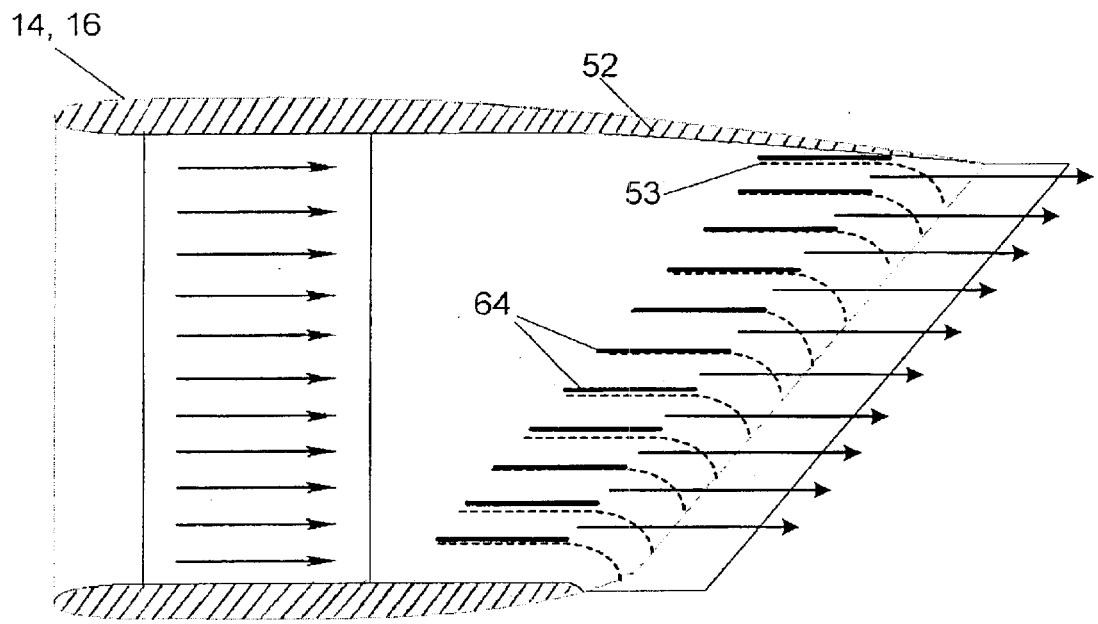
FIG. 6 is a schematic side cut-away view showing the deflection vanes of a nacelle in their retracted positions.
Figure 7:
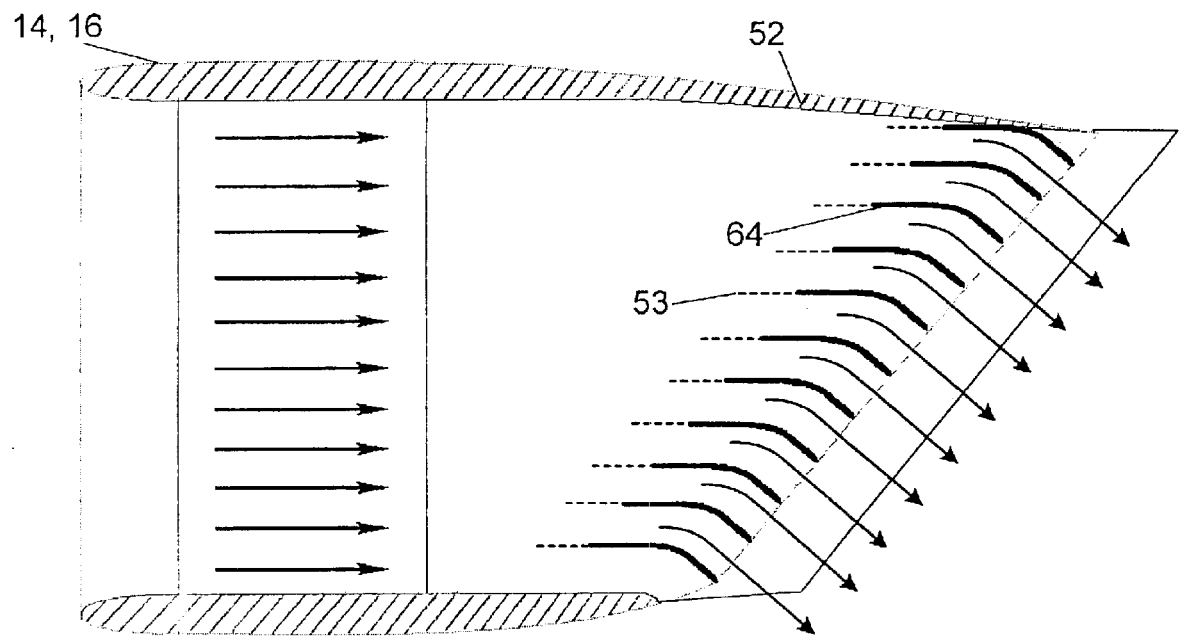
FIG. 7 is a schematic side cut-away view showing the deflection vanes of a nacelle in their extended positions.

As depicted schematically in FIGS. 6–9, the vanes 64 are located in the rear of the nacelles 14 and 16 just before the rear opening 54. Guide slots 53, of the type shown in the Moller '996 patent, and formed in the walls of the nacelle housing 52, define the paths that the vanes will travel as they are extended to deflect the airflow. It is to be noted however, that whereas the guide slots in the Moller '996 patent cause deformation of the articulated vanes over a flow deflection range of 0°–90°, the guide slots 53 only cause deformation of the articulated vanes sufficient to effect flow deflection over a range of 0°–45°, as depicted in FIG. 7. For some applications however, it may be advantageous to permit flow deflection of a few degrees over 45 degrees to allow for reverse motion of the vehicle when in hover mode.

Figure 1A:
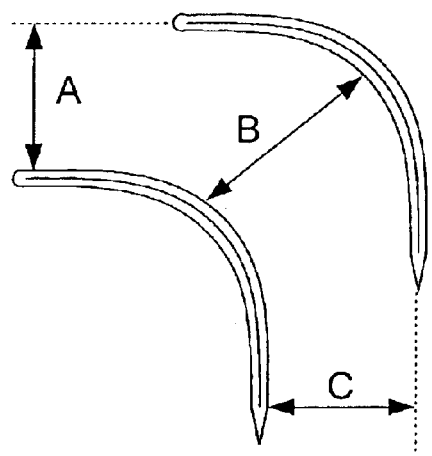
Figure 1B:
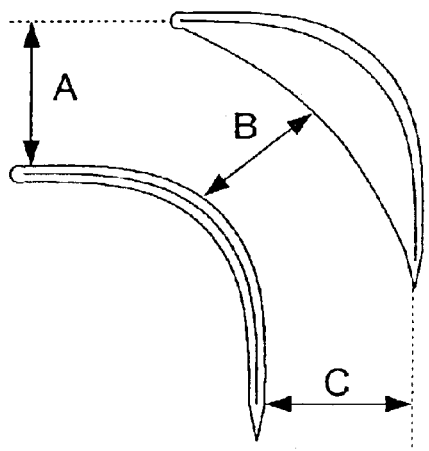
Figure 1C:
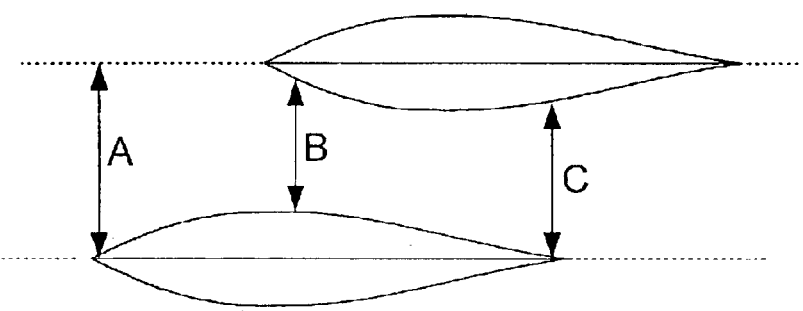

Vane actuation, described in the Moller '996 patent, is accomplished by moving the flexible vanes in the guide slots 53. But in contrast to the 90 degree limit of the Moller '996 embodiment, the curved ends of the slots 53 in the present invention limit the extension and deformation of vanes 64 such that the flow is turned approximately 45 degrees at the full extension of the vanes. This limitation restricts the growth of the flow separation associated with the turning of the flow. As mentioned in the preceding sections and shown in FIGS. 1A–C, sharp turning of the flow leads to flow separation on the surfaces of the vanes 64 and on the inner walls holding the lateral ends of the vanes 64, and, as a consequence, the efficiency of the vane systems declines as the turning angle increases. However, to produce the required lift for take-off, hovering, and landing, the flow must be directed downwardly, i.e., turned to 90 degrees. According to the present invention, the turning of the flow by 90 degrees is accomplished not solely by the vanes but is accomplished by extending the vanes 64 toward their 45 degree limit and simultaneously tilting the nacelles 14 and 16 up to 45 degrees.

FIGS. 6 and 8 show the nacelle 16 and the vanes 64 at their retracted positions as in the case during level flight. As can be noticed, the nacelle 16 is rotated back to 0 degree from the horizontal, and the exit area of the rear opening 54 is reduced as compared to what it was when the vanes are fully deployed. In general, the flow speed within the nacelles 14 and 16 is proportional to the vehicle's flight speed. Thus, without any area reduction mechanism, the flow speed within the nacelles 14 and 16 will increase as the vehicle's flight speed increases. However, the frictional loss is proportional to the third power of the flow velocity within the nacelles 14 and 16, and reduces the thrust. In accordance with the present invention, the reduction of the exit area of the rear opening 54 due to vane retraction keeps the thrust from declining rapidly as the vehicle's speed increases during level flight.

FIGS. 7 and 9 show the vanes 64 at their fully extended positions and the nacelle 16 at its maximum tilting angle of 45 degrees as in the case during take-off, hovering, and landing. The turning of the nacelle to its 45 degree position in conjunction with vane flow deflection of approximately 45 degrees has another important advantage over engine and propeller configuration of the prior art aircraft; the propeller wash and the stall of engine driven propellers are avoided during the transition from vertical to level flight. As mentioned, some of the prior art aircraft tilt the propellers through 90 degrees from the vertical to the horizontal direction during the transitions, which induces propeller wash across the control surfaces. To handle the effects of the propeller wash, extra structure and control surfaces are required. Other prior art aircraft tilt their nacelles housing the propellers or fans through 90 degrees during the transitions of the flight mode. In this type of propulsion system, as the nacelles pass through the mid range of tilt, the flow separates at the upstream inlet lips of the nacelles and, as a consequence, the engine driven propellers or fans tend to stall in the region where the nacelles are vertical through about 45 degrees of tilt. By limiting the tilting of the nacelles 14 and 16 to less than 45 degrees, the leading edge duct stall is avoided in the present invention.

As suggested above and as depicted in FIGS. 10A–11B, deflecting the flow by 45 degrees using vanes and nacelle configurations in accordance with the present invention results in a larger exit area of the rear opening 54 and, as a consequence, leads to an increase in thrust due to the following relationships between thrust, power, and exit area:

$$T = \rho A_{EXIT} V_{EXIT}^2$$

$$T = 14.2 A_{EXIT}^{1/3} (H.P.)^{2/3}$$

where $\rho$ is the density of air, $A_{EXIT}$ is the exit area of the rear opening 54, $V_{EXIT}$ is the velocity of the flow at the exit of the rear opening 54, and H.P. is the horsepower of the engine. As shown in FIGS. 11A–B, the effective exit area 8 (FIG. 11B) of the nacelle 16 is 41% larger when the vanes 64 are used to deflect the flow by 45 degrees. The 41% increased exit area is estimated to result in a 12.24% increase in thrust for the same engine power, which is another advantage of limiting the deflection of the flow to 45 degrees.

In accordance with the present invention, and as will be explained, the tilting of the nacelles 14 and 16 and the extension of the vanes 64 are gradually performed to modulate the duct exit area and vector the thrust generated by the nacelles during the transitions of flight mode. This means that the fans 60 and 62 (FIG. 5) do not need to change their pitch as the aircraft speed increases as in the case of ducted or non-ducted but tiltable engine/propeller or fan source of thrust without the ability to reduce the duct exit area. This is to say that whereas the pitch change in the prior art aircraft relies on the complex design of propellers or fans and structural mechanisms to control the propellers' pitch, in accordance with the present invention, the propeller or fan pitch is effectively adjusted without such complexities.

Figure 12A:
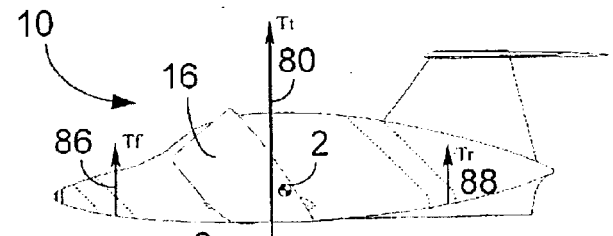
Figure 12B:
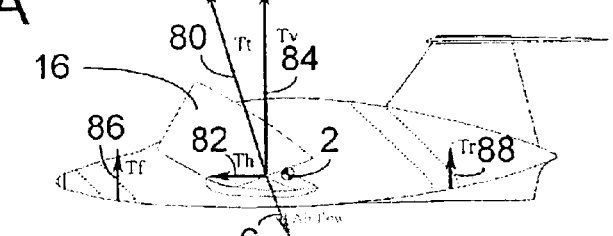
Figure 12C:
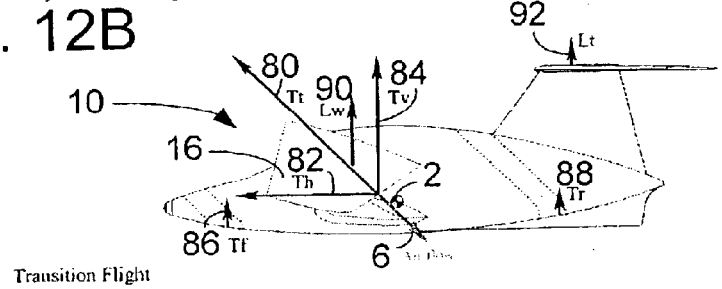
Figure 12D:
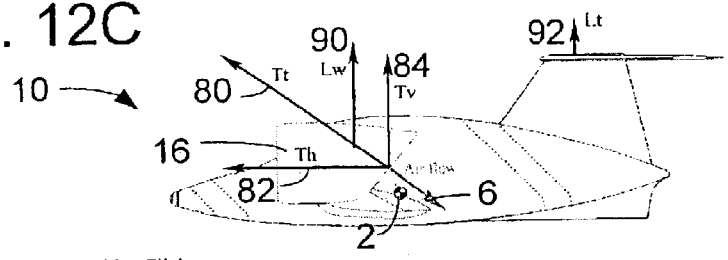
Figure 12E:
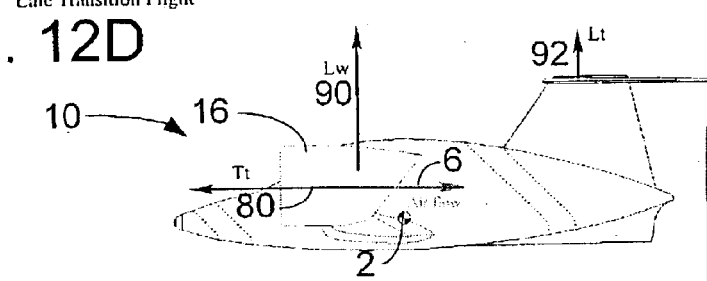

FIGS. 12A–E show the vehicle 10 in various stages of flight, from initial take-off configuration (FIG. 12A) to level flight (FIG. 12E). The arrow 6 represents the direction of airflow at the rear openings 54 of the nacelles 14 and 16, even though for convenience only the nacelle 16 is shown. In these figures, the center of gravity 2 is shown in approximate position.

Specifically, FIG. 12A shows the take-off/landing configuration, in which the nacelles 14 and 16 are tilted to 45 degrees from the horizontal, and the vanes (not visible) are fully extended. The direction of the airflow 6 is nearly vertical to provide the maximum lift. Total thrust vector 80 is the sum of the thrust from the nacelles 14 and 16, the thrust vector 86 from the front auxiliary thruster, and the thrust vector 88 from the rear auxiliary thruster.

FIG. 12B illustrates an early stage of transition, in which the nacelles 14 and 16 have been slightly tilted back towards the horizontal. Again, the total thrust vector 80 is the sum of the engine thrust from the nacelles and the auxiliary thrust vectors 86 and 88. The horizontal thrust vector 82 and the vertical thrust vector 84 are respectively the horizontal and vertical components of the total thrust vector 80. At this stage, wing lift is small compared to the magnitude of the total lift vector 80 and is not shown.

FIG. 12C illustrates the vehicle 10 in mid-transition flight configuration, as the nacelles 14 and 16 are rotated further towards the horizontal. Again, the total thrust vector 80 is the sum of the engine thrust from the nacelles and the auxiliary thrust vectors 86 and 88. The vertical component of the total lift vector 80, which is the sum of the vertical thrust vector 84, the wing-body lift vector 90, and the tail lift vector 92, must exceed the weight of the vehicle in order to maintain its height above ground level or ascend. The horizontal thrust, as indicated by vector 82, accelerates the vehicle in the horizontal direction.

The power from each engine in the nacelles 14 and 16 is used to control the thrust from the corresponding nacelle and thereby the angle of attack of the fuselage 12. This determines the magnitude of the wing-body lift vector 90 that is the sum of the aerodynamic lift vectors from the wings 18, the fuselage 12, and the nacelles 14 and 16 (lifting ducts). It is important that these aerodynamic lift vectors together be generated most efficiently. This is achieved by measuring the angle of attack of the fuselage 12, airspeed and desired rate of acceleration as determined by hand control position while knowing from test data the ideal combination of these three during transition. This can all be programmed in look-up table, etc., so that these adjustments are made automatically. Hand-control position is important because it controls vane position once rate-of-climb and desired altitude is chosen. As the vanes (not shown) change position, they also affect the external aerodynamics of the airflow around the fans of the nacelles 14 and 16. This then affects the current embodiment's most efficient lift generating combination of speed and angle of attack.

FIG. 12D shows the vehicle 10 in its late transition flight configuration. The auxiliary thrusters are required to produce less thrust, and the nacelles 14 and 16 are almost completely horizontal. The vanes (not visible) are still extended so that the airflow 6 is still directed at an angle from the horizontal. The total thrust vector 80 still provides most of the lift, as suggested by the vertical thrust vector 84, as well as the horizontal thrust as depicted by vector 82. However, as airspeed increases, the wing-body lift vector 90 and the tail lift vector 92 increase in magnitude.

FIG. 12E illustrates the vehicle configuration when it has fully transitioned to level flight. The vanes (not shown) have been retracted to their horizontal positions, so that the airflow 6 exits horizontally causing the total thrust vector 80 to now be purely horizontal. In level flight, the sum of the wing-body lift vector 90 and the tail lift vector 92 is equivalent to the weight of the vehicle.

FIGS. 13A–C show three variations in placement of the nacelles 14 and 16 relative to the center of gravity 2, and the effect of the inclusion of auxiliary thrusters in the design of the vehicle. Partial cut-away views showing the placement of the auxiliary thrusters are also included in these FIGS.

More specifically, in FIG. 13A, the lift 7 generated by the nacelle air stream 6 is at or near the center of gravity 2. In this case, in order to provide stability control during take-off, it is desirable to have both a front auxiliary thruster 20, producing thrust as indicated by the vector 86, and a rear auxiliary thruster 22 producing thrust as indicated by the vector 88. The arrows 87 and 89 represent the streams of airflow generated by the fans 23a and 23b of the auxiliary thrusters 20 and 22, respectively.

In FIG. 13B, the nacelle is positioned forward of the center of gravity 2 and the lift 7 generated by the nacelle air stream 6 is likewise forward of the center of gravity 2. Accordingly, a nose-up moment is generated by the lift and the vehicle's weight acting on the center of gravity 2. In this case, it is desirable to have a rear auxiliary thruster 22, producing thrust as indicated by the vector 88. The magnitude of the thrust vector 88 is not required to be great, since it acts at a large distance from the fulcrum point, the center of gravity 2. As mentioned, the auxiliary thruster 22 can be as simple as an electrically driven fan, or as complicated as a gas powered engine driving a fan blade.

In FIG. 13C, the lift 7 generated by the nacelle air stream 6 is rearward of the center of gravity 2. In this case, a nose-down moment is generated by the lift and the vehicle's weight acting on the center of gravity 2. It is now desirable to have a front auxiliary thruster 20, producing thrust as indicated by the vector 86. Again, the magnitude of this thrust vector 86 is not required to be great, since it acts at a large distance from the center of gravity 2. Again, the auxiliary thruster 20 can be as simple as an electric fan or a motor/propeller configuration.

As suggested, there may be several different possible mechanisms for powering these auxiliary thrusters 20 and 22. For example, it is possible to use internal power generation, perhaps from a small turbine-engine located in the tail, such as are used in commercial aircraft. Alternatively, when the thrusters are electric motor and fan, a fuel cell, ultra-capacitors or a lithium polymer battery could be used to provide electric power therefore.

As the auxiliary thrusters 20 and 22 can be used to provide extra lift when maximum thrust is required during take-off, and can be shut down during level flight, the installed power required from the engines 56 and 58 is smaller. This means that the engines 56 and 58 will be operating at a higher percentage of their total installed power capability in level flight, which increases the specific fuel consumption in level flight.

As shown in FIGS. 14 and 15, the nacelles 14 and 16 are attached to the wings 18 by a rotational mechanism 48 which includes a bearing and shaft or some other suitable structure that allows rotation of the nacelle about an axis extending into the wingtip. A linear actuator 94, which is the tilting mechanism used in the present embodiment, has one end 95 connected to the wing 18 at 97, and an opposite end 96 connected to a lower portion of the nacelle at 98. The linear actuator 94 is shown in its retracted position in FIG. 14, so that the nacelle 14 is oriented horizontally. A rotational position encoder 93 or other suitable angular indicator is mounted on the axis of the rotational mechanism 48 to measure the tilting angle of the nacelle and is a part of the flight control systems that will be explained later.

For the purpose of illustration, the vanes 64 are shown in their retracted positions in the slots 53 in a partially cut-away portion of the nacelle depicted in FIG. 14. FIG. 15 shows the same nacelle with the linear actuator 94 fully extended, thus causing the nacelle to rotate between its horizontal position (dashed lines) and a position approximately 45 degrees from the horizontal as indicated by the dashed double headed arrow 99.

An alternate embodiment 100 is shown in FIGS. 16–19. As illustrated in FIG. 16, the alternate embodiment has most of the components of the first embodiment; a fuselage 112, a pair of wings 118 foldable at break lines 119, a vertical stabilizer 124, a horizontal stabilizer 126, a transparent canopy 128, two passenger windows 130, and a first pair of nacelles 114 and 116 rotatively attached to the wingtips 150 and rotatable by linear actuators 152. However in this embodiment, embodiment 100, two additional nacelles 115 and 117 are also rotatively attached to the fuselage 112 by short wings 155 and are rotatable by additional pair of linear actuators (not shown).

In this embodiment, the wings 118 and the rear nacelles 114 and 116 have been moved further towards the rear of the fuselage 112 as compared to the first embodiment, and the forward pair of nacelles are attached to fuselage 112 forward of the canopy 128. All four nacelles 114–117 can rotate to approximately 45 degrees from the horizontal and have interior vanes (not shown) that can be deployed to selectively deflect the airflow through the nacelle from 0 to 45 degrees.

FIG. 17 is a perspective view of this embodiment showing the wings 118 folded at their break lines 119. FIG. 18 is a side elevational view showing the nacelles 116 and 117 in their horizontally oriented forward flight position. The dashed lines 116' show the nacelle positions depicted in FIG. 17.

FIG. 19 is a side elevational view as in FIG. 16 and 18 except that in this view the nacelles are shown rotated substantially 45 degrees into their take-off/landing positions.

The principal difference between this embodiment and that of FIG. 2 is that this configuration provides approximately twice as much lift in that it includes two additional nacelles, and is more stable and controllable during take-off and descent modes due to its more powerful 4-points of lift.

In either embodiment of the present invention, ability to complete transition quickly is important because that is the period where the greatest risk exists should more than one engine fail. Assuming for example that one increases the thrust from the nacelles by 5% while reducing the tilting angle of the nacelles so that the vertical thrust supporting the weight remains constant. In this case, the nacelles are rotated towards the horizontal by 20 degrees from its maximum tilting angle of 45 degrees. The horizontal thrust generates a 10 ft/sec$^2$ acceleration. When the vehicle reaches 60 ft/sec or in 6 seconds, the aerodynamic lift reduces the vertical thrust required by 30% with an acceleration now near 25 ft/sec$^2$ and the nacelles are now positioned in the horizontal direction. As velocity increases further, the vanes will reduce their deflection angle. The requirement for vertical thrust finally disappears as acceleration continues to increase. Consequently, the vehicle's most efficient flight speed at sea level (140 mph) is reached in a total of less than 11 seconds assuming that its take-off power is maintained constant during the transition. The high acceleration allows the parachutes to become effective within 5 seconds after transition begins in the above scenario even at lower altitudes (less than 50 ft).

As indicated above with regard to the showing in FIG. 5, the present invention uses rotary type engines 56 and 58 that have low rotating inertia. Low inertia engines can rapidly change their RPM in response to a change in their throttle valve positions and, as a consequence, result in rapid modulation of their thrust. However, test results have shown that using independently operating counter-rotating engines in the same nacelle result in an aerodynamic coupling between the two engines. Thus, a change of RPM of the front engine 56 changes in a very direct way the approach angle of the air (angle of attack) seen by the blades of the rear fan 62. The changed angle of attack of the rear blades 62 will cause the rear engine 58 to change its RPM. This will then alter in a secondary way the velocity of flow through the front fan 60 which will cause a further change in the RPM of the engine 56. In effect, with the engines operating at a fixed throttle position, any perturbation of the flow entering the front fan 60 will cause engine 56 speed up or slow down somewhat.

The result of this change of RPM is that the rear fan 62 will change RPM opposite to the front fan 60. This aerodynamic coupling will then create an unsteady engine speed and resultant thrust. The consequence of this coupling to the engine control system is that RPM changes (one-to-two second cycle time) is seen as background noise in the electronic RPM feedback loops. The engine control system of the present invention solves this problem by electronically controlling the rotational speed of each engine so that the front and rear engines of each nacelle are required to run at the same RPM, or at a constant RPM, except when commanded to change. Such electronic control system results in a precise relationship between engine throttle valve position and engine RPM. Also, as engine thrust is a function of engine RPM, rapid and precise modulation of engine thrust can be provided by controlling the engine throttle valve.

In addition, in the present invention, orientation of nacelle and/or change in vane position can be used for vehicle attitude control without RPM change or in conjunction with RPM change. In general, an aircraft has various control surfaces and complex structures related thereto for attitude control. Thus, it is an another advantage of the present invention that the vehicle attitude control can be performed with or without involving additional control surfaces. For example, during level flight, by varying the vane positions in the various nacelles, vehicle pitch and roll can be selectively controlled either in concert with orientation of traditional vehicle control surfaces or independently thereof. Moreover, even faster attitude changes can be achieved by simultaneous differential variation of engine power among the nacelles in combination with vane position variation.

FIG. 20 is a simplified block diagram of the redundant control system of the second embodiment that electronically synchronizes the eight engines M1–M8. Therein, each of the sensor packs A and B has inertial sensors and four nacelle sensor units. Each nacelle unit includes two sensors for sensing throttle position (one for each engine in the nacelle), eight sensors for sensing vane position (one for each of the two sets of vane systems in each nacelle), two tachometers for monitoring engine speed (one for each engine), and one angular position encoder for sensing tilting angle of the nacelle. Flight control systems A and B receive input from the pilot operated joystick and the two sensor packs. The microprocessors in the flight control systems determine flight parameters, which are then, converted into equivalent position settings of various actuators. One of the actuators is a servo drive that controls throttle position of each engine to change the engine's RPM. The RPM and throttle position of the engine are monitored by the tachometer and the throttle position sensor of the engine, respectively. These sensors send their signals to the flight control systems to form a feed back system for the engine throttle control, as shown in FIG. 20.

The first embodiment above described has a similar flight control system to that shown in FIG. 20, except that only four engines M1–M4 and two nacelle sensor units are included. A detailed description of a similar flight control systems can be found in my prior patent (Moller '996 patent).

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A VTOL vehicle comprising:
   an elongated fuselage defining a longitudinal axis of said vehicle, said fuselage being configured to develop aerodynamic lift when said vehicle is moving forward in the direction of said longitudinal axis;

a vertical stabilizer connected to an aft portion of said fuselage;

a horizontal stabilizer connected to and supported by said vertical stabilizer;

a first pair of wings, each of said wings having a root rigidly attached to said fuselage, a wingtip, and a folding mechanism disposed between said root and said wingtip for accommodating ground travel or storage;

a first pair of nacelles, each said nacelle being rotatively secured to the wingtip of and supported by one of said wings and forming a duct having powerplant means and propeller/fan means driven thereby which rotate about a longitudinal axis of said duct and cause air to flow therethrough, and an airflow directing vane system including a plurality of vanes disposed at the aft end of said duct and movable between a retracted position directing airflow passing out of said nacelle in a direction parallel to the longitudinal axis of the duct, and an extended position controlling exit area and directing said airflow at an angle of approximately 45 degrees relative to the longitudinal axis of the duct;

a tilting mechanism associated with each said nacelle and operative to rotate the corresponding nacelle between a first position directing the longitudinal axis of the corresponding duct in a direction substantially parallel to the longitudinal axis of said vehicle, and a second position directing the longitudinal axis of said corresponding duct at an angle of approximately 45 degrees relative to the direction of the longitudinal axis of the duct when the nacelle is in its first position; and control means for controlling the power generated by each said powerplant means, the orientation of each said nacelle as caused by the corresponding tilting mechanism, and the operative position of the vanes of each said corresponding vane system, said control means being operative to cause airflow through said ducts to be directed downwardly to cause said vehicle to rise vertically, and to transition to a rearward direction to cause said vehicle to move in a forward direction, the power supplied by each said powerplant means, the orientational positions of each said nacelle and the operational position of each said vane system being coordinated to maintain the balance and stability of said vehicle.

2. A VTOL vehicle as recited in claim 1, wherein each said powerplant means includes a pair of engines located along the longitudinal axis of the corresponding nacelle duct, each said engine directly driving corresponding propeller/fan means, the propeller/fan means being caused to counter-rotate with respect to each other at the same rotational speed.

3. A VTOL vehicle as recited in claim 2, wherein said control means includes:

sensor means for sensing said vehicle pitch, roll and yaw, and for developing pitch signals, roll signals and yaw signals; and means responsive to said pitch, roll and yaw signals, and operative to generate coordinated control signals for controlling the power generated by each said powerplant means, the operation of each said tilting mechanism, and the positioning of the vanes in each said vane system so as to maintain a desired direction of thrust generated by each said powerplant and the exit area of each said duct.

4. A VTOL vehicle as recited in claim 3, further comprising:

a plurality of nacelle position sensors, each said sensor being responsive to the rotational position of corresponding nacelle, and operative to develop tilt position signals commensurate therewith for communication to said control means.

5. A VTOL vehicle as recited in claim 4, wherein each said tilting mechanism includes a linear actuator connected between a nacelle and its supporting wing.

6. A VTOL vehicle as recited in claim 1 further comprising:

at least one auxiliary thrust system carried by said fuselage and operative to generate an independent stream of downward airflow for providing lift and pitch control for said vehicle.

7. A VTOL vehicle as recited in claim 6, wherein said thrust system includes an open-ended circular duct formed in said fuselage, and a motor and fan driven by said motor disposed within said circular duct and operative to cause stream of airflow to flow through said circular duct.

8. A VTOL vehicle as recited in claim 7, wherein said motor is an electrically energized motor, and said thrust system further includes a power supply means for energizing said motor.

9. A VTOL vehicle as recited in claim 8, wherein said one thrust system is located on said fuselage on one side of the center of gravity of said vehicle and another thrust system is located on the opposite side of the center of gravity, said another thrust system providing additional auxiliary lift and pitch control for said vehicle.

10. A VTOL vehicle as recited in claim 5, further comprising:

a second pair of wings attached to said fuselage; and a second pair of nacelles functionally similar to said first pair of nacelles, and respectively disposed on opposite sides of said fuselage and rotatively attached to said second pair of wings.

11. A VTOL vehicle as recited in claim 10, wherein said first pair of wings are attached to said fuselage aft of the center of gravity of said vehicle, and said second pair of wings are attached to said fuselage forward of said center of gravity of said vehicle.

12. A VTOL vehicle as recited in claim 11, wherein said second pair of wings are substantially longer that said first pair of wings.

13. A VTOL vehicle as recited in claim 1, wherein when said first pair of nacelles are in said first position, the longitudinal axes thereof define level flight thrust lines extending along the sides of said fuselage, and wherein said horizontal stabilizer is positioned well above said level flight thrust lines.

14. A VTOL vehicle as recited in claim 10, wherein when said first pair of nacelles are in said first position, the longitudinal axes thereof define first level flight thrust lines extending along the sides of said fuselage, and wherein said horizontal stabilizer is positioned well above said first level flight thrust lines, and wherein, when said second pair of nacelles are in said first position, the longitudinal axes define second level flight thrust lines extending parallel to the longitudinal axis of said fuselage and outside the distal ends of said horizontal stabilizer.

15. A VTOL vehicle as recited in claim 1, wherein said control means includes throttle means for allowing individual control of the power generated by each said powerplant means and vane control means for allowing individual control of the vane position in each said nacelle, thereby allowing a pilot to control pitch and roll of said vehicle in level flight.

* * * * *